(12) United States Patent
Wang et al.

(10) Patent No.: US 7,368,721 B2
(45) Date of Patent: May 6, 2008

(54) IMAGING DEVICES AND METHODS EMPLOYING MASKS WITH A NON-UNIFORM GRID OF PINHOLE APERTURES

(75) Inventors: Sharon Xiaorong Wang, Hoffman Estates, IL (US); James T. Chapman, Glen Ellyn, IL (US); Ronald E. Malmin, Chicago, IL (US); Trudy Dayle Rempel, Glen Ellyn, IL (US); Fred E. Macciocchi, Huntley, IL (US); James Frank Caruba, Bartlett, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 403 days.

(21) Appl. No.: 10/951,324

(22) Filed: Sep. 27, 2004

(65) Prior Publication Data

US 2005/0072928 A1    Apr. 7, 2005

Related U.S. Application Data

(60) Provisional application No. 60/506,524, filed on Sep. 26, 2003.

(51) Int. Cl.
*G01T 1/161* (2006.01)

(52) U.S. Cl. .................................................. 250/363.06
(58) Field of Classification Search ........... 250/363.06; 378/149, 35
See application file for complete search history.

(56) References Cited

U.S. PATENT DOCUMENTS

| 5,864,141 | A  | * | 1/1999 | Majewski et al. | ...... 250/363.02 |
| 6,353,227 | B1 | * | 3/2002 | Boxen | ...................... 250/363.1 |
| 7,232,990 | B2 | * | 6/2007 | Wang et al. | .............. 250/252.1 |
| 2003/0034455 | A1 | * | 2/2003 | Schreiner et al. | ........... 250/366 |
| 2004/0084624 | A1 | * | 5/2004 | Meng et al. | .............. 250/363.1 |
| 2006/0011847 | A1 | * | 1/2006 | Wang et al. | ........... 250/363.09 |
| 2006/0065826 | A1 | * | 3/2006 | Wang et al. | .............. 250/252.1 |
| 2007/0018109 | A1 | * | 1/2007 | Wang et al. | ........... 250/363.09 |

\* cited by examiner

*Primary Examiner*—David Porta
*Assistant Examiner*—David S Baker

(57) ABSTRACT

In some preferred embodiments, an apparatus is provided that facilitates correction, such as, e.g., linearity correction, in imaging devices, such as, e.g., scintillation cameras. In preferred embodiments, a mask is implemented that can produce images for locating the actual position of a nuclear event based on its apparent position with high accuracy and reliability. In the preferred embodiments, the mask includes a non-uniform array of apertures that can achieve this goal.

45 Claims, 8 Drawing Sheets

FIG. 1A
FIG. 1B
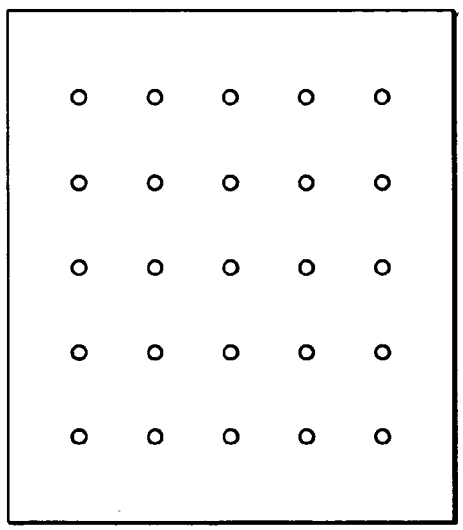
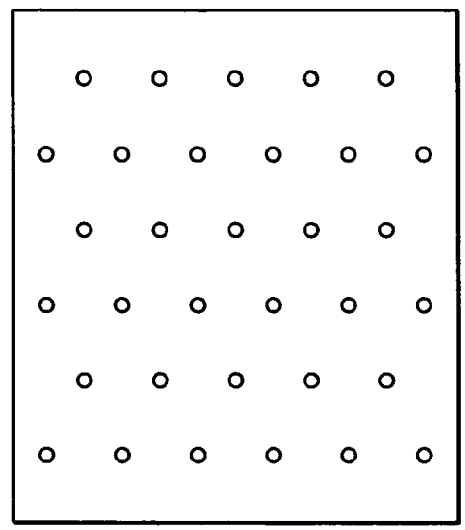
FIG. 2
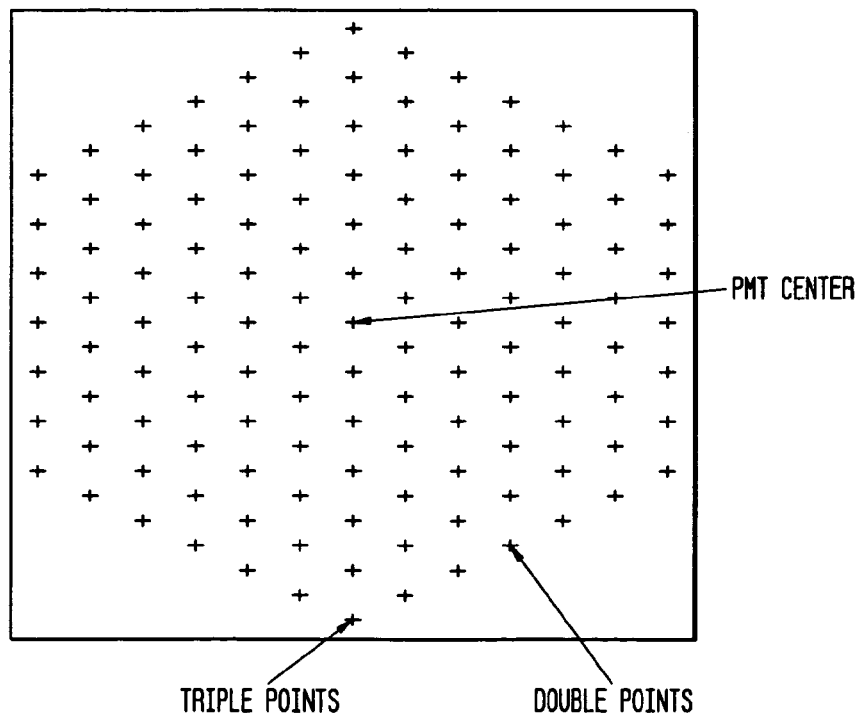
TRIPLE POINTS    DOUBLE POINTS

IMAGING DEVICES AND METHODS EMPLOYING MASKS WITH A NON-UNIFORM GRID OF PINHOLE APERTURES

This application claims benefit of U.S. Provisional Application No. 60/506,524, filed 26 Sep. 2003.

BACKGROUND

The present invention relates to imaging devices and preferred embodiments relate, more particularly, to scintillation cameras used, e.g., in medical imaging and/or the like.

In various environments, such as, e.g., in medical environments, imaging devices can include detectors that detect electromagnetic radiation emitted from, e.g., radioactive isotopes or the like within a patient or the like. The detectors can involve, e.g., gamma scintillation cameras or the like that pick up, e.g., gamma rays emitted by the isotope. By way of example, while a patient lies motionless on a test table or the like, a gamma scintillation camera can be used to acquire images and record them on a computer for analysis.

Existing scintillation cameras experience spatial distortion that requires linearity correction (LC). A significant amount of effort has been made seeking to correct spatial or linearity distortion (along with, e.g., the companion energy and flood corrections). Existing methods can be divided into, e.g., two categories.

A first category is illustrated in U.S. Pat. No. 3,745,345 (the '345 patent) entitled Radiation Imaging Device, the entire disclosure of which is incorporated herein by reference. Here, a camera head is covered by a lead mask having a grid of pinhole apertures. A sheet source of radiation causes each aperture to illuminate a scintillation crystal. The camera then records an apparent location of an event in the crystal. There is a difference between the actual pinholes and the apparent events as located by the camera that is representative of spatial distortion at the respective locations on the camera face. Accordingly, a correction factor is needed for each point in a stored array.

A second category is illustrated in U.S. Pat. No. 4,212,061 entitled Radiation Signal Processing and U.S. Pat. No. 4,316,257 entitled Dynamic Modification Of Spatial Distortion Correction Capabilities Of Scintillation Camera, which involve spatial correction. For calibration, a lead mask having slit apertures is used. The camera is exposed to a radiation source, first with the mask in x lines and then with the mask in y lines. For each such exposure orientation, a series of transverse peak measurements at select intervals is developed. An analytical expression is generated to represent event coordinates between calibration intervals. Each orientation exposure, thus, produces one of a pair of calibration coordinates, which in turn permit direct correspondence to associated spatial coordinates. Among other deficiencies in this method, this method can take more than one hour of time by itself. It also requires additional preparation such as 'centering and gain'. Moreover, this method requires use of multiple masks wastes time and money and increases equipment downtime.

Although there has been a significant amount of effort applied in the development of algorithms for LC, the lead masks used in the processes have received little attention. In fact, pinhole apertures utilized in existing devices have involved pinhole apertures arranged in a uniform and rectangular distribution (such as, e.g., depicted in FIG. 1 and depicted in FIG. 2 of the '345 patent). This existing design has a number of deficiencies, such as, e.g.: a) generating a low number of data points; and b) being less reliable where spatial distortion is more severe, such as, e.g., proximate edges and/or when thicker crystals are employed. In addition, existing lead masks do not enhance functionality in the overall calibration process, such as, e.g., to enable shorter calibration times and/or higher accuracies.

While a variety of methods and apparatuses are known, there remains a need for improved methods and apparatuses overcoming the above and/or other problems.

BRIEF DESCRIPTION OF THE DRAWINGS

The preferred embodiments of the present invention are shown by a way of example and not limitation in the accompanying figures, in which:

FIG. 1(A) shows a conventional-type mask having a rectangular distribution of apertures;

FIG. 1(B) shows an embodiment of a mask having a hexagonal distribution of apertures;

FIG. 2 shows an embodiment with a plurality of pinhole apertures located under a photo-multiplier tube;

SUMMARY OF THE INVENTION

Figure 3:
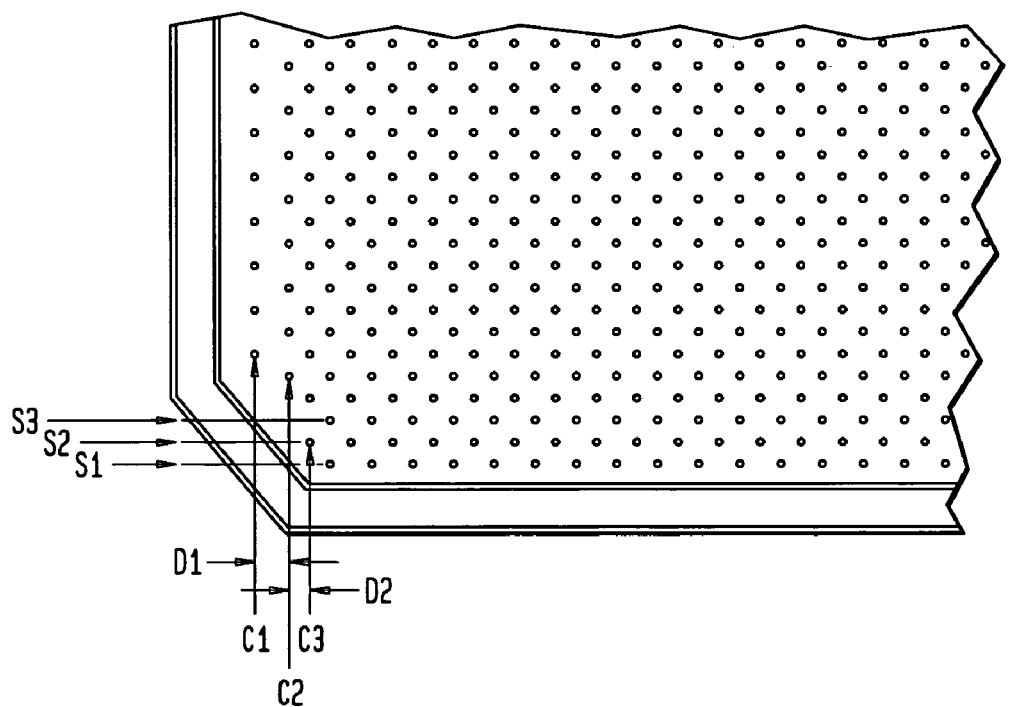
FIG. 3 shows an illustrative embodiment in which an increased spacing is provided between pinholes near the edges of a field of view.

The preferred embodiments of the present invention can significantly improve upon existing methods and/or apparatuses.

According to some embodiments of the invention, a radiation imaging apparatus includes: a) a scintillation crystal; b) a gamma ray emitting radioactive source; c) a mask having an array of apertures in a non-rectangular distribution through which gamma rays emitted by the radioactive source pass and produce scintillations in the crystal.

According to some embodiments of the invention, a mask for a radiation imaging apparatus includes: a plate having an array of apertures in a non-rectangular distribution through which gamma rays emitted by a radioactive source can pass and produce scintillations in a crystal.

According to some embodiments of the invention, a method for reducing distortion in a radiation imaging apparatus includes: a) placing a mask having an array of apertures in a non-rectangular distribution between a radiation source and a detector; b) emitting radiation from the radiation source through the apertures to the detector.

In some examples, the non-rectangular distribution is an n-sided polygon distribution, where n does not equal 4, and apertures are located at polygon vertices. In some examples, the non-rectangular distribution includes a hexagonal distribution. In some examples, the non-rectangular distribution includes a non-uniform distribution. In some examples, the non-uniform distribution includes different spacing proximate at least one edge of a field of view of the array of apertures. In some examples, the non-uniform distribution includes a variation in aperture spacing in the array (e.g., corresponding to distortion in the crystal such as to inhibit signal cross-contamination). Preferably, the radiation imaging apparatus further includes an array of photo-multiplier tubes. In addition, the array of apertures preferably includes apertures at triple points of the photo-multiplier tubes and/or at double points of the photo-multiplier tubes.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

In some preferred embodiments, an apparatus is provided that facilitates correction, such as, e.g., linearity correction, in imaging devices, such as, e.g., scintillation cameras. In preferred embodiments, a mask is implemented that can produce images for locating the actual position of a nuclear event based on its apparent position with high accuracy and reliability. In the preferred embodiments, the mask includes a non-uniform array of apertures that can achieve this goal.

The preferred embodiments of the invention include a lead mask having a non-rectangular and/or non-uniform distribution of pinhole apertures. In use, a point source of radiation causes each aperture to illuminate a scintillation crystal. Then, a camera records the apparent location of the event in the crystal. The non-uniform grid of pinholes is designed in such a way that the image produced can facilitate highly accurate points for location detection. With the preferred embodiments described herein, costs related to camera calibration can be substantially reduced and/or camera linearity NEMA specifications of gamma cameras can be substantially improved. Various embodiments can be used in various nuclear medicine cameras. Various embodiments may also be used in a variety of radiation and/or other applications, such as, e.g., where a calibration process is used. In some embodiments, new LC procedures can provide significant time and/or material savings while preserving and/or even improving the detector National Electrical Manufacturer's Association (NEMA) performance.

In some embodiments, a lead mask is provided that facilitates the new LC procedure. In preferred embodiments, the lead mask has an array or grid of pinhole apertures (i.e., small apertures) that are arranged in a non-rectangular distribution. Here, the terminology rectangular distribution means an arrangement like that shown in FIG. 1(A) of this application or in FIG. 2 of the '345 patent. In preferred embodiments, the lead mask has a non-uniform distribution of pinhole apertures. The array or grid of apertures is preferably designed in such way that the mask can perform as many tasks as possible—thus, for example, providing robustness to crystal variation and/or Photo-Multiplier Tube (PMT) location offset. Some of the potential benefits that can be realized, in some illustrative and non-limiting embodiments, include:

1. Reducing a substantial amount of calibration time (such as, e.g., in some embodiments, eliminating about 75 minutes of the calibration time per detector or even more).
2. Reducing the amount of masks and/or materials used (such as, e.g., avoiding the need for masks in some existing systems that have, e.g., three masks [x and y line masks and a ROI mask]).
3. Reducing complexity of the calibration process by, e.g., combining x and y line acquisition, and/or eliminating ROI, and/or eliminating centering and/or gain processes.
4. Increasing the number of data points (such as, by way of illustration only, providing about 119% more data points for ⅜" and/or ⅝" detectors and/or about 54% more data points for about 1" detectors). Notably, increasing the data points can increase the initial LC accuracy, which can benefit uniformity gradient processing and the final linearity.
5. Reducing the calibration failure rate (for example, by using a non-uniform grid, which can generate a more uniform image for tolerance of variation and/or drift near the edges). Notably, this can be particularly advantageous for re-burn of 1" detectors.
6. Increasing the LC accuracy at the edges (such as, e.g., by providing data points outside of Field of View [FOV]).

Figure 8:
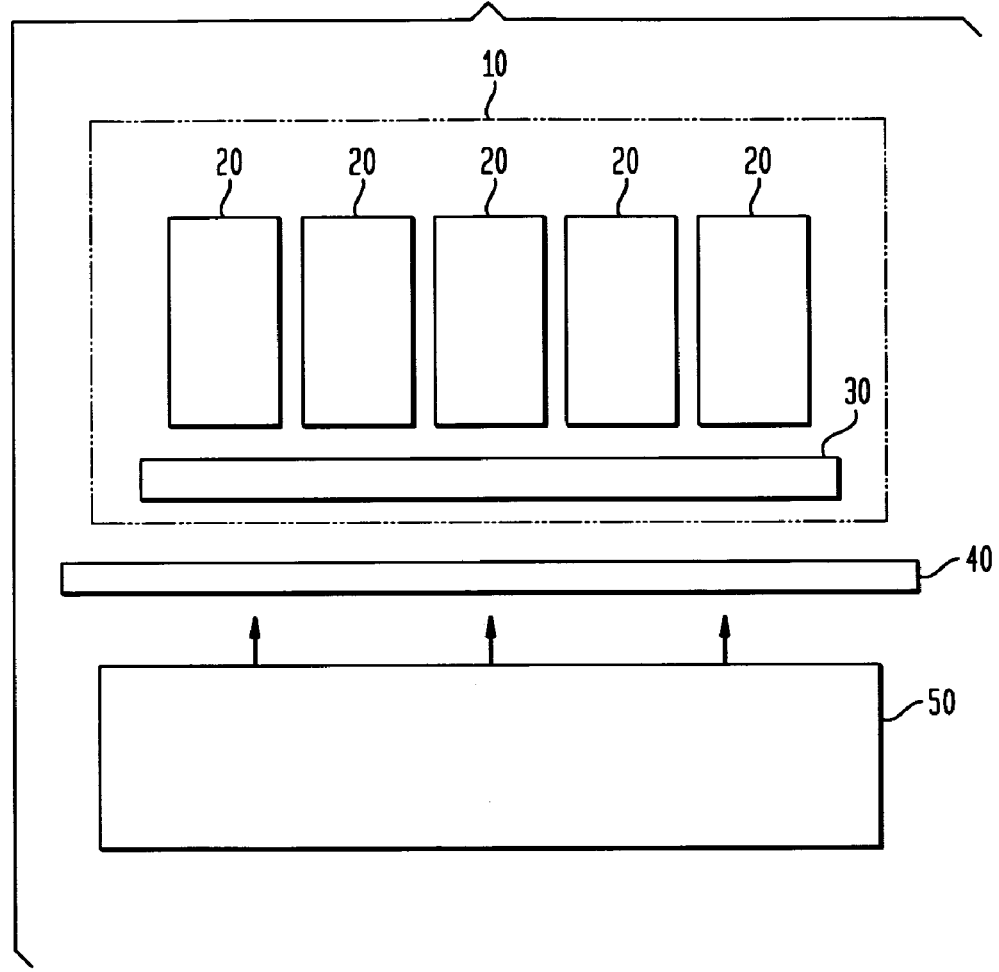
FIG. 8 is a diagram of an illustrative apparatus in which one or more aspect(s) of the present invention may be employed or implemented.
Figure 9A:
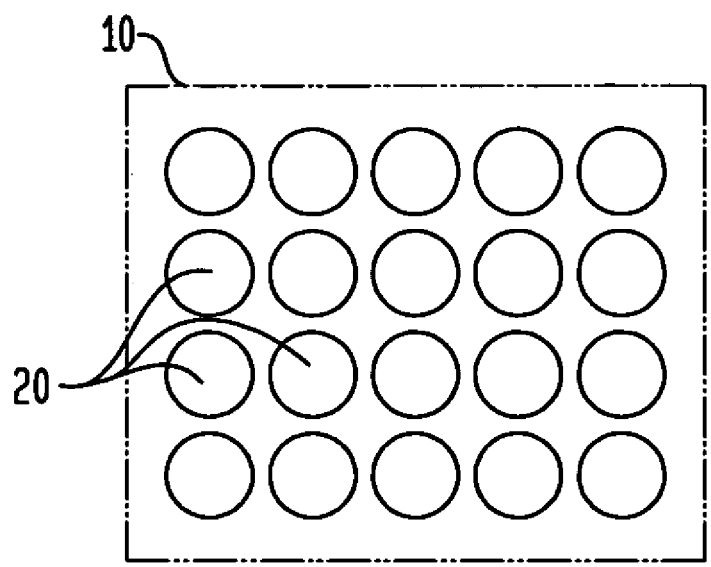
FIGS. 9(A) and 9(B) show illustrative photo-multiplier tube arrangements according to some illustrative and non-limiting embodiments.
Figure 9B:
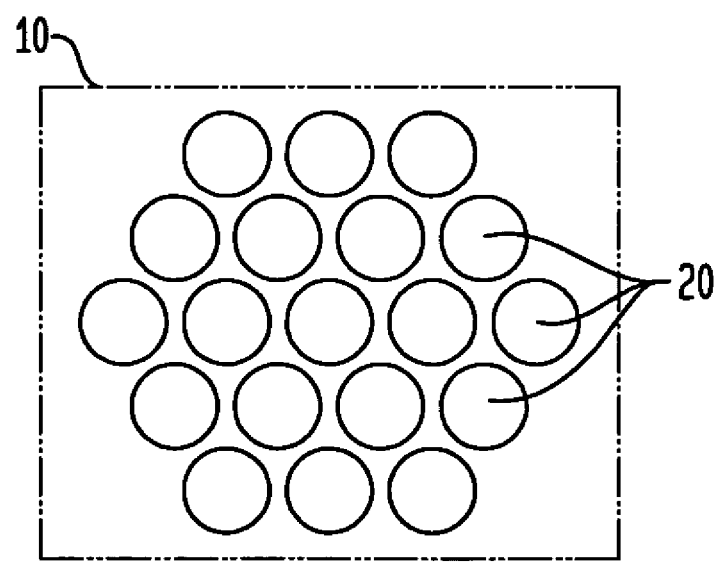

FIG. 8 shows an illustrative implementation including a detector or camera 10, a mask 40 (which is preferably constructed according to one or more embodiment described herein), and a radiation source 50. In the illustrated embodiment, a camera 10 includes a scintillation crystal 30 and an array of photo-multiplier tubes 20. FIGS. 9(A) and 9(B) show some illustrative arrangements photo-multiplier tube arrays according to some embodiments shown by way of example only. Other appropriate arrangements could be used based on circumstances.

Non-Rectangular (Such As, E.G. Hexagonal) Distribution

As indicated above, in some preferred embodiments, a lead mask is provided with a non-rectangular distribution of pinhole apertures. As discussed above, in use, a point source of radiation causes each aperture to illuminate a scintillation crystal. Then, a camera records the apparent location of the event in the crystal. The non-uniform grid of pinholes is designed in such a way that the image produced can facilitate highly accurate points for location detection.

Because the image size is typically, by way of example, about 256×256 pixels or larger, it is desirable to have more data points on the mask. However, the number of pinholes is limited by the spacing between points. For example, when two pinholes are too closed together, their signals may contaminate each other and, e.g., cause peak location algorithm failure.

In this regard, the use of a non-rectangular distribution of apertures can be advantageous. For example, as compared with rectangular distributions, hexagonal distributions can be used that allow a denser arrangement of pinholes on the mask where the spacing between holes is the same. As shown, e.g., in FIGS. 1(A) and 1(B), a rectangular distribution in FIG. 1(A) can provide about 56% more data points than a rectangular distribution in FIG. 1(B) within a similar region. In particular, in these illustrative examples, FIG. 1(A) shows an array or grid having a rectangular distribution with 20 data points and FIG. 1(B) shows an array or grid having a hexagonal distribution with 39 data points (with equal spacing between data points in these figures).

While FIG. 1(B) shows one preferred embodiment using a hexagonal distribution of apertures, other non-rectangular distributions can be employed in other embodiments. By way of example, while hexagonal distributions can include apertures at vertices of a six-sided polygon, other embodiments can include apertures at vertices of other n-sided polygons (where n is a number other than 4). Additionally, other distributions can be utilized, such as, e.g., where apertures are not at vertices of n-sided polygons) depending on circumstances.

Photo-Multiplier Tube Distortion

1. Double and Triple Points

Typically, spatial distortion is largely caused by Photo-Multiplier Tubes (PMTs). Under each PMT, the spatial distortion has a similar pattern and points that have similar relative positions (e.g., distances) to PMTs show the distortions with the same characteristics. Accordingly, points that have equal distance to two or three PMTs can be referred to as double or triple points. These points exhibit much less spatial distortion than their neighboring points. Existing advanced linearity correction algorithms may take advantage of such points to achieve superior accuracy or computational speed.

In preferred embodiments, a mask is constructed in a manner to take advantage of these double and/or triple points. In some embodiments, the mask is constructed so as to arrange points symmetrically with respect to a PMT, such as, shown in FIG. 2. Preferably, at each double point and/or at each triple point, an aperture is provided to collect data to facilitate the advanced correction algorithms. In this regard, FIG. 2 illustrates an embodiment with a plurality of pinhole apertures located under one PMT, including with apertures at each double point and at each triple point.

In particular, FIG. 2 shows one preferred pinhole aperture distribution under one PMT (wherein each cross represents a pinhole location). In this embodiment, pinholes are arranged hexagonally with a center of the hexagonal distribution aligned with the PMT center. In this embodiment, the vertices of the hexagon are triple points. In that regard, the vertices are substantially equally distant to all three neighboring PMTs. On the other hand, the points in the middle of the hexagonal edges are double points, such that they are equally distant to two neighboring PMTs.

2. ROI Location

In addition to the direct benefit to LC, the preferred mask structure, such as, e.g., arranged as shown in FIG. 2, in relation to the PMT can provide a means to accurately locate the PMT centers. Thus, in some preferred embodiments, an ROI center location can be conducted without the need for an additional mask or the like.

Among other benefits, this may avoid the need for certain calculations or steps required in existing systems. For example, this may eliminate the need for ROI location, detector centering and/or gain calculation. Notably, in existing systems a separate ROI mask has been required to perform ROI location. In those instances, the ROI mask included, e.g., a circular hole to facilitate ROI determination.

In calibration, locating the PMT center is an initial step (which determination is used in other steps).

Region Variation (E.G. Edge Treatment)

In some embodiments, the apparatus can be modified so as to account for variation in distortion characteristics at different regions within the field of view (FOV). In this regard, e.g., the mask can be modified to have a non-uniform distribution of apertures in certain regions of the mask.

For example, at the FOV boundaries, the spatial distortion is typically more severe and shows different characteristics (e.g., as compared to the central region of the FOV). When there is a generally uniform spacing (such as, e.g., shown in FIGS. 1(A), 1(B) and 2), the signals produced at the edges are often not distinguishable and the accuracy of linearity coefficients can decline. Accordingly, in some preferred embodiments, a different pinhole spacing is provided around the edges of the FOV. In some embodiments, the problem can be addressed by increasing the pinhole spacings proximate the edges so that the resultant dot images can be recognizable and distinguishable.

In some embodiments, the selected increases in spacing in specified regions can be determined experimentally. For example, where image dots merge together, the mask apertures corresponding to merged dots can be increased slightly until a desired spacing is achieved.

By way of example, FIG. 3 shows an illustrative embodiment in which an increased spacing is provided between pinholes near the edges of the FOV. In this regard, FIG. 3 shows one illustrative arrangement in which apertures proximate a detector edge are spaced differently than other apertures in the FOV. In the illustrated embodiment, to obtain the desired separation in image space, the distances S1 and S2 between the columns C1-C2 and between the columns C2-C3, respectively, have different spacing from the rest of the columns. While the illustrated embodiment includes a variation in spacing between columns C1, C2 and C3, it is contemplated that other variations in spacing can be provided around the perimeter of the FOV depending on circumstances. For example, in other embodiments more or less columns (and/or rows) can have varied spacing in various embodiments.

In some embodiments, a variation in spacing can be provided around the entire perimeter of the FOV. In some embodiments, the variation in spacing can include an increased distance between apertures in closer to the outer edges. In some embodiments, a gradual decrease in spacing can be used in apertures as the distance from the edges increases. In some embodiments, different spacing variations can be used in a widthwise direction (e.g., between rows) adjacent the edges from that used in a height-wise direction (e.g., between columns) adjacent the edges.

In some illustrative embodiments, by way of example only, the spacing between outermost apertures can be about 40-70% larger than the spacing toward a center of the FOV, between the second tier of outermost apertures about 15-40% larger than the spacing toward a center of the FOV, between the third tier of outermost apertures about 5-30% larger than the spacing toward a center of the FOV. In one illustrative embodiment, the extra spacing between the outermost rows can include an increase in height as follows: S1=increase by about 55-65% (in some embodiments about 59.1%); S2=increase by about 25-35% (in some embodiments about 28.9%); S3=increase by about 20-25% (in some embodiments about 22.8%). In one illustrative embodiment, the extra spacing between the outermost columns can include an increase in height as follows:

C1=increase by about 47½-57½% (in some embodiments about 52.7%); C2=increase by about 15-25% (in some embodiments about 20.2%); S3=increase by about 5-15% (in some embodiments about 7.6%).

Aperture Spacing Calculations

In some embodiments, the apparatus can be modified so as to account for variation in distortion characteristics within the field of view (FOV). In this regard, e.g., the mask can be modified to have a non-uniform distribution of apertures across some or all of the entire FOV. In this regard, in some embodiments, the distance(s) between apertures at various locations within the FOV can be determined based on the following.

Figure 4A:
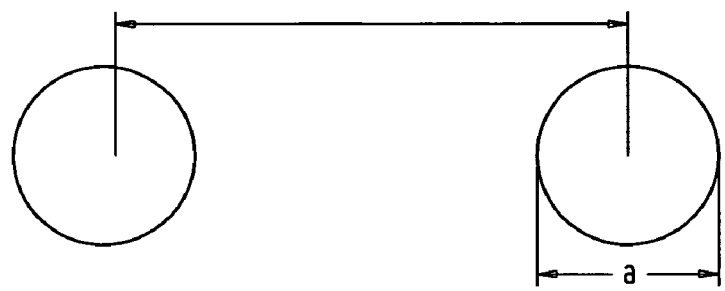
FIG. 4(A) depicts a distance between centers of adjacent apertures and an aperture diameter according to some illustrative embodiments.

To avoid signal cross contamination, the minimum spacing $d_{min}$ can be determined as $$d_{min} = 2 \text{FWHM}$$

where FWHM is the Full Width Half Maximum (e.g., a width corresponding to points on both sides of the Gaussian distribution curve that is one half of the maximum) at the center of a PMT. The FWHM may vary based on camera characteristics, such as, e.g., based on crystal thickness, PMT sizes, etc. For reference, FIG. 4(A) shows a distance $d_{min}$ between centers of adjacent apertures and an aperture diameter a (discussed further below).

In some preferred embodiments, the number of pinholes along a hexagon edge is an integer (such as, e.g., shown in FIG. 2), and the spacing d can be calculated as $$d = e/p$$

where e is the edge length of a PMT hexagon unit, while p is an integer such that d approaches $d_{min}$ while $d > d_{min}$.

Once the spacing is determined, the aperture of the pinhole can be calculated as $$a = 4L \sqrt{\frac{2C_r}{3.7 \times 10^7 m}}$$

where
 a=a diameter such as, e.g., shown in FIG. 4(A),
 L=a distance from, e.g., the point source (e.g., gamma ray source) to the detector,
 $C_r$=a desired count rate (e.g., photons per second) from the pinhole aperture,
 m=a source strength in mCi.

Figure 4B:
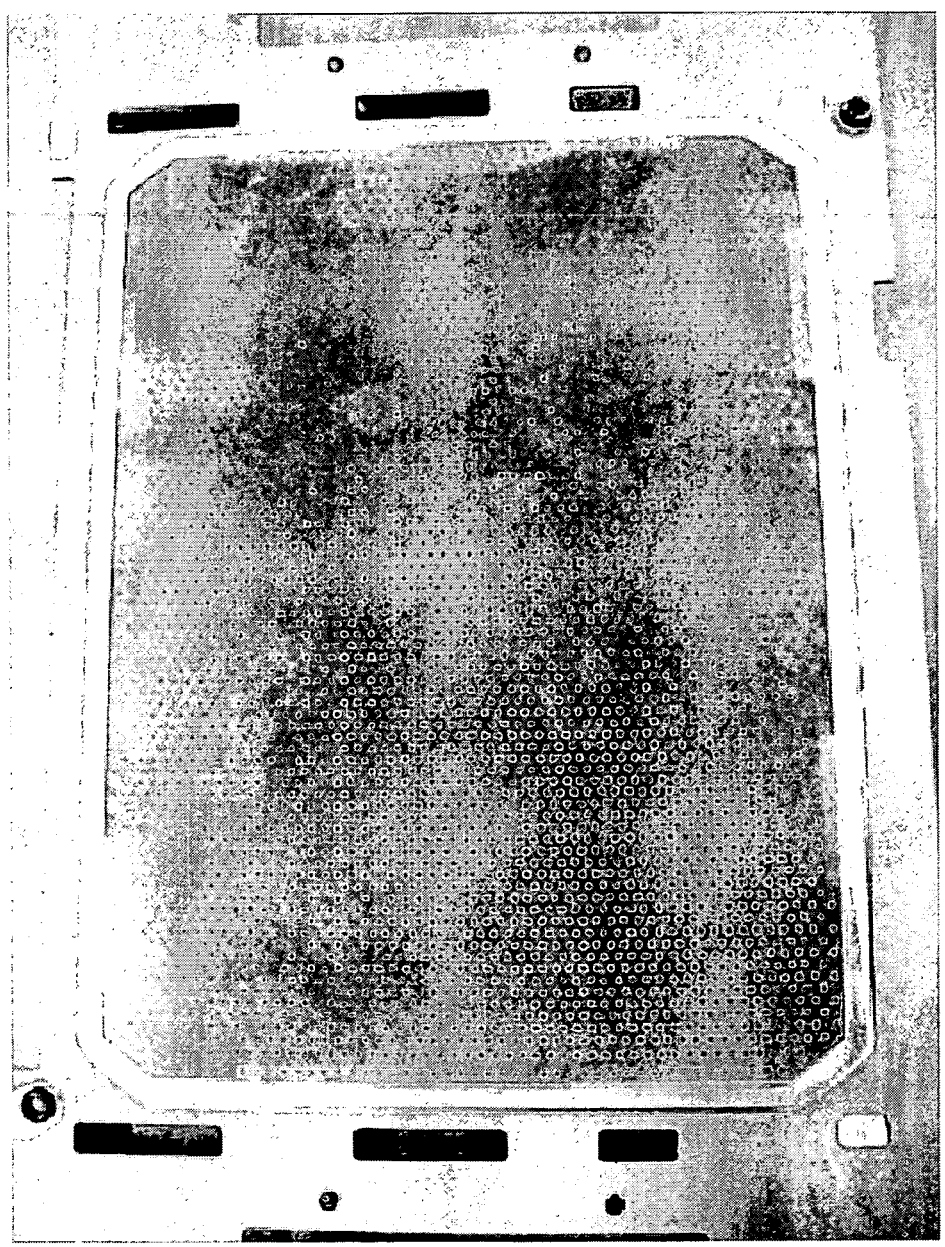
FIG. 4(B) shows a lead mask manufactured to have a non-uniform distribution of apertures.
Figure 5:
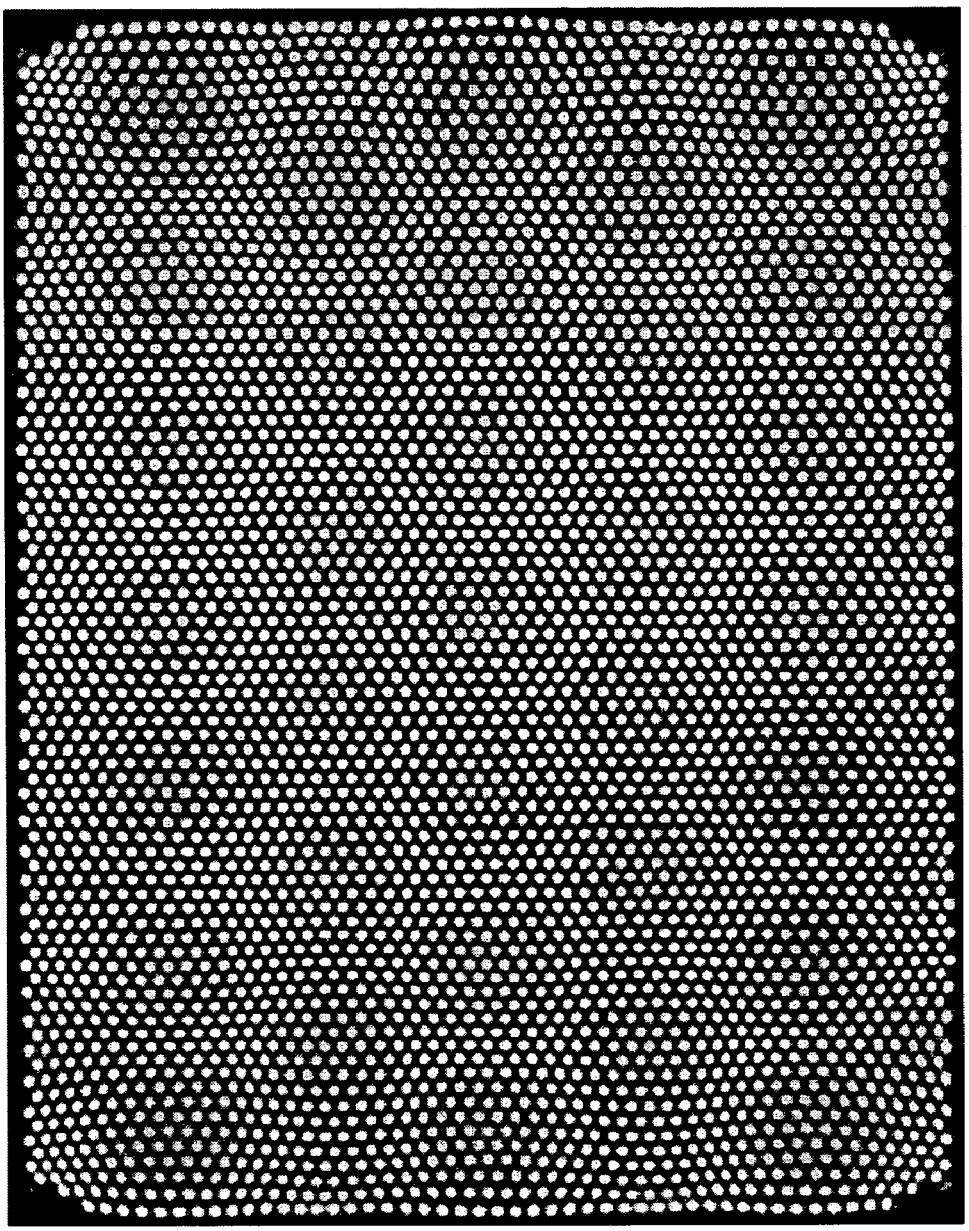
FIG. 5 shows an illustrative image acquired using a mask similar to that shown in FIG. 4(B)

FIG. 4(B) shows a lead mask manufactured to have a non-uniform distribution of apertures using this method (and including an increased width proximate the edges as discussed above). FIG. 5 shows an image acquired using the mask shown in FIG. 4(B). In some embodiments, a lead mask, such as shown in FIG. 4(B) is particularly advantageous for thinner crystal detectors.

Thick Crystal Designs

As the crystals become thicker, the non-linearity of the detector images tends to increase. For example, when crystals are thicker than about ⅝ inches, such as, e.g., with about 1-inch crystal detectors, the crystals become too sensitive, leading to calibration difficulties. For instances, with thick crystals, an image can be generated where the peaks at the centers of the PMT overlap so much that they are not distinguishable. This result is not satisfactory.

In some embodiments, these problems can be overcome with a specially designed detector resolution dependent grid.

First, the resolution along the radius of a PMT is measured in terms of an average Gaussian axis length σ, that is $$\sigma = 0.5(\sigma_x + \sigma_y)$$

where $\sigma_x$ and $\sigma_y$ are the axis lengths of Gaussian function along x and y axes, respectively. If we denote the normalized resolution as Σ, then $$\chi = \frac{\sigma}{\sigma_{min}}$$

In this regard, it can be seen that χ=1 at the triple points, where the resolution is the best.

Next, we choose the number of points using, e.g., the methodology described above in the Aperture Spacing Calculations section. Then, the location of each point can be determined by solving the equation $$D = \sigma_{min} \sum_{2}^{p-1} (2\chi_i + \chi_1 + \chi_p)$$

where
 D=half of distance between to PMT centers;
 p=the number of points from the PMT center to the PMT edge;
 $\chi_i$=the resolution at the i th point and $\chi_1$ and $\chi_p$ are the resolution at the $1^{st}$ and last point respectively.

Figure 6:
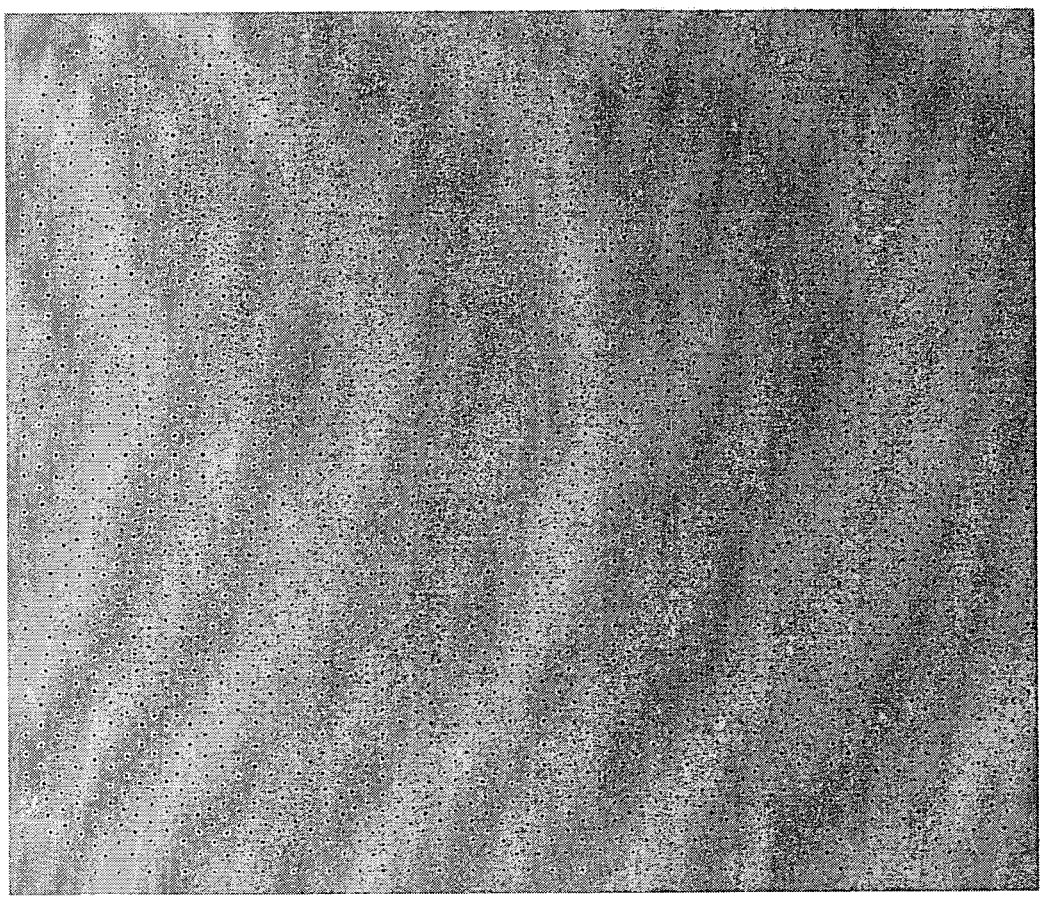
FIG. 6 shows an illustrative embodiment having a mask with a non-uniform aperture distribution.
Figure 7:
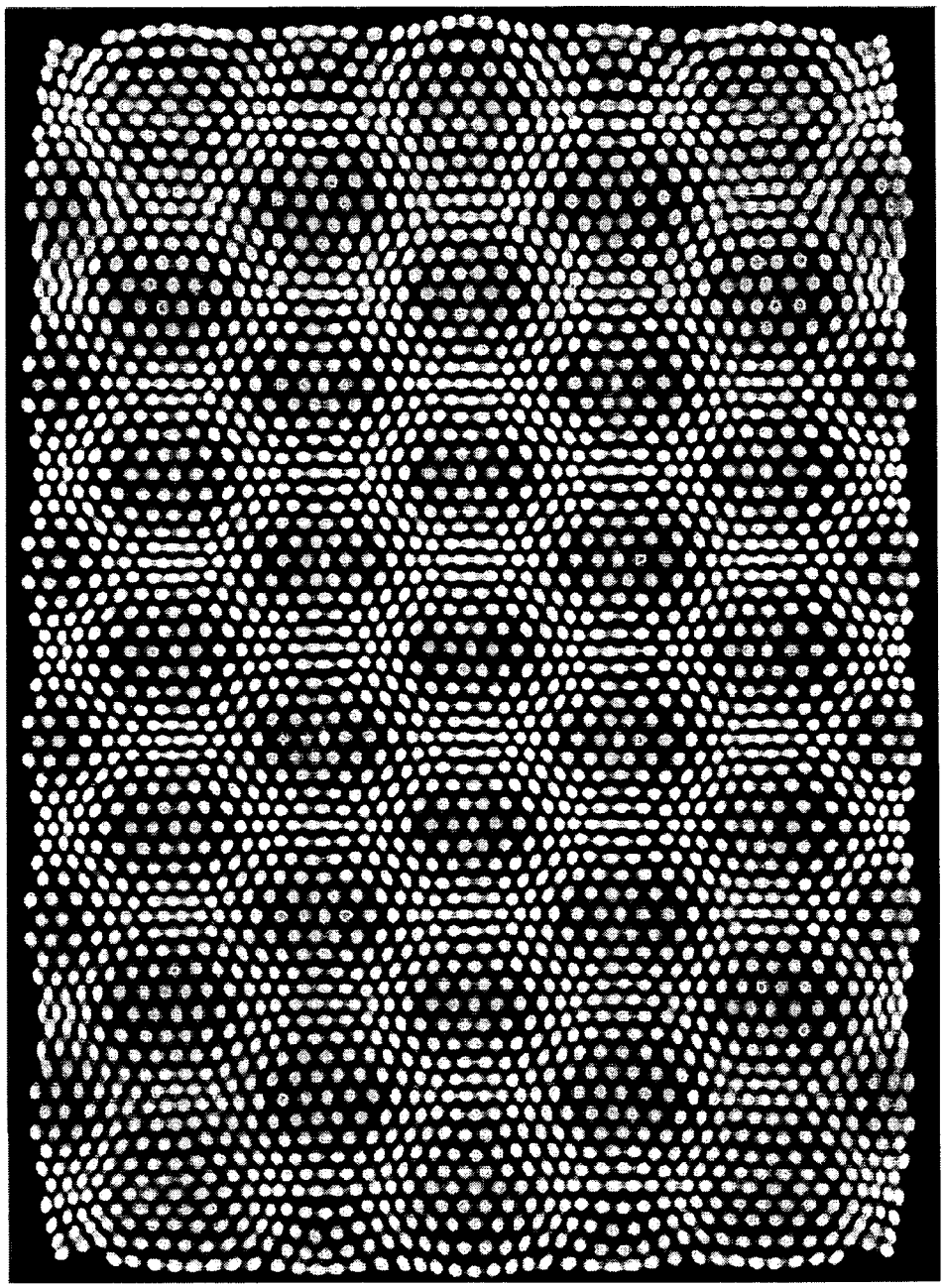
FIG. 7 shows an illustrative image acquired using a mask similar to that shown in FIG. 6.

As would be understood based on this disclosure, the above equation has infinite solutions for a proper p. This can be solved by using an iterative approach using any well-known searching method. Finally, using the index i (i=1, 2, . . . p), the location of all points can be determined. Using this method a new array or grid can be derived having a non-uniform aperture distribution. In this regard, FIG. 6 shows, an illustrative non-uniform aperture distribution achieved in this manner in one non-limiting example. FIG. 7 shows an image acquired using the grid shown in FIG. 6. IN this illustrative example, as shown in FIG. 7, all of the pinholes produce distinguishable peaks while, at the same time, the population of the data points is dense. As described above, the array or grid arrangement shown in FIG. 6 is particularly advantageous for thicker detectors. Among other things, in this embodiment, it can be seen that the PMT centers and the edges of the grid is less dense because the resolution there is lower.

Broad Scope of the Invention

The algorithm for finding the coefficients for linear calibration to compensate for spatial inhomogeneities assumes that energy distribution is uniform, Therefore, "hot spots" and "cold spots" resulting from the granularity of the PMTs a can be corrected by adding or subtracting from them. However, the algorithm looks at the values of the energy detected around any given point. If the point is near the edge then less data is available to the algorithm to calculate the correction for the given point. One way to address this problem is to increase the distance between the apertures near the edge of the collimator (see FIG. 3). More specifically, since less data is gathered for the edge apertures overall, this will have less of a global effect, statistically speaking. Since we know the location of the edge, we can predict the resulting spatial inhomogeneities due to the edge, and correct by subtracting there errors by using the grid itself. Note that the Anger logic looks at energy (voltage) of one PMT over a time period versus another, not one to one of a number of apertures. As stated above, the diameter of an aperture is at least twice the FMHW of the expected signal is the optimum yields the minimum diameter. Note that the PMT diameter is much greater than the diameter of any single aperture, and generally will cover several apertures. Design feature of hexagonal pattern is that center of PMT will be the least resolution. You can use this design requirement to find the optimum (minimum) aperture diameter. The crystal determines the FWHM of the signal. The FWHM of the signal determines the minimum diameter of the apertures. Thus with the equation above, p can be generated. Note that a is the aperture depth. Radiation detector electronics do not allow the signal form each PMT to be distinguished. The largest source of non-linearity is the PMTs. However, when the collimator is thicker than one inch, another source of nonlinearity becomes predominate (or at least a design issue). Using the statistical weighing in our model we can correct. Thallium doped NaI crystal has a known resolution response from which we can derive the diameter, and thus derive an optimum in which the resolution is the inverse of the PMT. There is about 1 millimeter alignment accuracy for collimator. FOV (filed of view) is arbitrarily defined. Calibration needs the linear correction map. Then needs to find center of PMTs.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A radiation imaging apparatus, comprising:
   a) a scintillation crystal;
   b) a gamma ray emitting radioactive source; and
   c) a mask having an array of pinhole apertures in a non-rectangular distribution through which gamma rays emitted by said radioactive source pass and produce scintillations in said crystal, wherein the pinhole apertures of said array are spaced to provide correction for spatial non-linearities of said radiation imaging apparatus.

2. The radiation imaging apparatus of claim 1, further including an array of photo-multiplier tubes.

3. The radiation imaging apparatus of claim 2, wherein said array of apertures includes apertures at triple points of said photo-multiplier tubes.

4. The radiation imaging apparatus of claim 2, wherein said array of apertures includes apertures at double points of said photo-multiplier tubes.

5. The radiation imaging apparatus of claim 2, wherein said array of apertures includes apertures at double points and at triple points of said photo-multiplier tubes.

6. The radiation imaging apparatus of claim 1, wherein said non-rectangular distribution is an n-sided polygon distribution, where n does not equal 4, and apertures are located at polygon vertices.

7. The radiation imaging apparatus of claim 1, wherein said non-rectangular distribution includes a hexagonal distribution.

8. The radiation imaging apparatus of claim 1, wherein said non-rectangular distribution includes a non-uniform distribution.

9. The radiation imaging apparatus of claim 8, wherein said non-uniform distribution includes different spacing proximate at least one edge of a field of view of said array of apertures.

10. The radiation imaging apparatus of claim 9, wherein said different spacing includes an increased spacing between apertures proximate at least one edge of said field of view.

11. The radiation imaging apparatus of claim 10, wherein said apertures include a plurality of rows and a plurality of columns of apertures, wherein spacing between outer rows of apertures is increased and wherein spacing between outer columns of apertures is increased.

12. The radiation imaging apparatus of claim 11, wherein said increased spacing is an increase of more than 5%.

13. The radiation imaging apparatus of claim 11, wherein said increased spacing is an increase of more than 10%.

14. The radiation imaging apparatus of claim 11, wherein said increased spacing is an increase of more than 20%.

15. The radiation imaging apparatus of claim 11, wherein said increased spacing is an increase of more than 30%.

16. The radiation imaging apparatus of claim 11, wherein said increased spacing is an increase of more than 40%.

17. The radiation imaging apparatus of claim 11, wherein said increased spacing is an increase of more than 50%.

18. The radiation imaging apparatus of claim 8, wherein said non-uniform distribution includes a variation in aperture spacing in said array.

19. The radiation imaging apparatus of claim 18, wherein said non-uniform distribution includes a variation in aperture spacing in said array corresponding to distortion in said crystal such as to inhibit signal cross-contamination.

20. The radiation imaging apparatus of claim 18, wherein a minimum spacing between a plurality of said apertures is: $d_{min} = 2$ FWHM.

21. The radiation imaging apparatus of claim 18, wherein a diameter of a plurality of said apertures is:

$$a = 4L\sqrt{\frac{2C_r}{3.7 \times 10^7 m}}$$

where a=aperture diameter,
L=distance from said radioactive source,
$C_r$=count rate, m=source strength in mCi.

22. The radiation imaging apparatus of claim 8, wherein said non-uniform distribution includes a detector resolution dependent array of apertures.

23. The radiation imaging apparatus of claim 22, wherein said detector resolution dependent array of apertures produces distinguishable peaks along with a dense population of data points.

24. The radiation imaging apparatus of claim 23, wherein said crystal is thicker than 5/8 inch.

25. The radiation imaging apparatus of claim 24, wherein said crystal is at least 1-inch thick.

26. The radiation imaging apparatus of claim 22, wherein a location of a plurality of apertures in said array is determined by:

$$D = \sigma_{min} \sum_{2}^{p-1} (2\chi_i + \chi_1 + \chi_p)$$

where D=half of a distance between photo-multiplier tube centers;
$\sigma_{min}$=a Gaussian axis length function of a PMT;
p=a number of points from a PMT center to a PMT edge;
$\chi_i$=a resolution at an i th point and
$\chi_1$ and $\chi_p$ are resolutions at a first and at a last point, respectively.

27. A mask for a radiation imaging apparatus, comprising:
a plate having an array of pinhole apertures in a non-rectangular distribution through which gamma rays emitted by a radioactive source can pass and produce scintillations in a crystal, wherein the pinhole apertures of said array are spaced to provide correction for spatial non-linearities of said radiation imaging apparatus.

28. The mask of claim 27, wherein said non-rectangular distribution is an n-sided polygon distribution, where n does not equal 4, and apertures are located at polygon vertices.

29. The mask of claim 27, wherein said non-rectangular distribution is a hexagonal distribution.

30. The mask of claim 27, wherein said non-rectangular distribution is a non-uniform distribution.

31. The mask of claim 30, wherein said non-uniform distribution includes different spacing proximate at least one edge of a field of view of said array of apertures.

32. The mask of claim 30, wherein said non-uniform distribution includes a variation in aperture spacing in said array corresponding to distortion in said crystal such as to inhibit signal cross-contamination.

33. The mask of claim 30, wherein said non-uniform distribution includes a detector resolution dependent array of apertures, wherein said detector resolution dependent array of apertures produces distinguishable peaks along with a dense population of data points.

34. A method for reducing distortion in a radiation imaging apparatus, comprising:
a) placing a mask having an array of pinhole apertures in a non-rectangular distribution between a radiation source and a detector, wherein the pinhole apertures of said array are spaced to provide correction for spatial non-linearities of said radiation imaging apparatus;
b) emitting radiation from the radiation source through said apertures to said detector;
c) measuring said emitted radiation; and
d) using emitted radiation measurements to provide correction for spatial distortion in said radiation imaging apparatus.

35. The method of claim 34, further including having said non-rectangular distribution be an n-sided polygon distribution, where n does not equal 4, and apertures are located at polygon vertices.

36. The method of claim 35, further including having said n-sided polygon distribution be a hexagonal distribution.

37. The method of claim 34, further including having said non-rectangular distribution be a non-uniform distribution.

38. The method of claim 34, further including having said non-uniform distribution include different spacing proximate at least one edge of a field of view of said array of apertures.

39. The method of claim 34, further including having said non-uniform distribution include a variation in aperture spacing in said array corresponding to distortion in said crystal such as to inhibit signal cross-contamination.

40. The method of claim 39, further including determining a minimum spacing between a plurality of said apertures by the following equation:

$$d_{min} = 2FWHM.$$

41. The method of claim 39, further including having a diameter of a plurality of said apertures determined by the following equation:

$$a = 4L\sqrt{\frac{2C_r}{3.7 \times 10^7 m}}$$

where a=aperture diameter,
L=distance from said radioactive source,
$C_r$=count rate,
m=source strength in mCi.

42. The method of claim 34, further including having said non-uniform distribution include a detector resolution dependent array of apertures.

43. The method of claim 42, further including having said detector resolution dependent array of apertures produce distinguishable peaks along with a dense population of data points.

44. The method of claim 43, further including providing said detector with a crystal that is at least 1-inch thick.

45. The method of claim 42, further including determining a location of a plurality of apertures in said array by the following equation:

$$D = \sigma_{min} \sum_{2}^{p-1} (2\chi_i + \chi_1 + \chi_p)$$

where D=half of a distance between photo-multiplier tube centers;
$\sigma_{min}$=a Gaussian axis length function of a PMT;
p=a number of points from a PMT center to a PMT edge;
$\chi_i$=a resolution at an i th point and
$\chi_1$ and $\chi_p$ are resolutions at a first and at a last point, respectively.

* * * * *